(12) United States Patent
Miyamoto et al.

(10) Patent No.: US 6,456,579 B1
(45) Date of Patent: Sep. 24, 2002

(54) METHOD FOR RECORDING INFORMATION, APPARATUS FOR RECORDING INFORMATION, AND INFORMATION RECORDING MEDIUM

(75) Inventors: Makoto Miyamoto, Ome; Nobuhiro Tokushuku, Katsura; Hiroyuki Minemura, Kokubunji; Tetsuya Ikeda, Hitachinaka; Kenji Tokumitsu, Odawara; Kazuo Shigematsu, Yoshikawa; Harukazu Miyamoto, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/642,779

(22) Filed: Aug. 22, 2000

(30) Foreign Application Priority Data

May 22, 2000 (JP) ........................................ 2000-154364

(51) Int. Cl.[7] ............................................... G11B 7/00
(52) U.S. Cl. ................................. 369/59.13; 369/59.23
(58) Field of Search .......................... 369/275.3, 275.4, 369/59.13, 59.14, 59.23, 59.24, 59.25, 47.2, 47.21, 47.23, 47.3, 13, 53.18, 53.24, 53.37

(56) References Cited

U.S. PATENT DOCUMENTS 5,446,597 A * 8/1995 Matsumi et al. ............. 360/48
6,031,800 A * 2/2000 Narumi et al. ............. 369/47.3
6,031,814 A * 2/2000 Nagata et al. ............. 369/275.3
6,111,850 A * 8/2000 Miyauchi et al. ......... 369/275.3
6,115,340 A * 9/2000 Van Den Eden et al. 369/275.3
6,115,537 A * 9/2000 Yamada et al. ............. 386/109
6,128,260 A * 10/2000 Tanoue et al. ............. 369/275.3

FOREIGN PATENT DOCUMENTS

| JP | 8077719 | * | 3/1996 |
| JP | 10-49872 | | 2/1998 |
| JP | 11045508 | * | 2/1999 |

* cited by examiner

Primary Examiner—Thang V. Tran
(74) Attorney, Agent, or Firm—Mattingly, Stanger & Malur, P.C.

(57) ABSTRACT

Before original information is recorded in areas such as a recording medium management area where the same pattern of information is recorded many times, a dummy pattern that minimizes a recording film flow is recorded. Because the direction of the recording film flow depends on the length of a mark length, the dummy pattern is a pattern including marks with a unique length. Randomly or sequentially selecting and recording a plurality of dummy patterns, each with a recording film flow direction different from others, prevents jitters, which will be caused by the recording film flow, from increasing.

14 Claims, 7 Drawing Sheets

Flowing direction of
the recording material

METHOD FOR RECORDING INFORMATION, APPARATUS FOR RECORDING INFORMATION, AND INFORMATION RECORDING MEDIUM

BACKGROUND OF THE INVENTION

The present invention relates to a method and an apparatus for recording information on an information recording medium by directing an energy beam to the medium to melt its recording film, and to the information recording medium used by the method. More particularly, the present invention relates to a method and an apparatus for recording information on phase change disks such as a DVD-RAM and a DVD-RW, and to an information recording medium used for the method.

In the description of the present invention, the information recording medium described above is mentioned as a phase change optical disk or simply as an optical disk. However, the present invention applies to any information recording medium on which information is recorded by directing an energy beam to the medium to heat and melt its recording film in order to change the atomic arrangement. Therefore, regardless of the shape of an information recording medium, the present invention is applicable also to a method and an apparatus for recording information on non-circular information recording media such as an optical card, and to an information recording medium used for the method.

In addition, the energy beam described above is sometimes mentioned simply as a laser beam or as a light. However, any energy beam capable of generating heat on an information recording medium to melt its recording medium may be used in the present invention as described above. Furthermore, although a red laser (645 nm to 660 nm of wavelength) is used in the method and the apparatus according to the present invention, the present invention is applicable also to a high-density optical disk using a relatively shorter wavelength laser, such as a blue laser and a purple laser.

Recently, phase change optical disks such as a 2.6 GB DVD-RAM, capable of reproducing information from reproduction-only optical disks such as a DVD-ROM or DVD-Video, have been placed on the market. However, the 2.6 GB DVD-RAM does not respond sufficiently to the consumer's needs in the recording capacity. This raises expectations for a 4.7 GB DVD-RAM or a 4.7 GB DVD-RW. That is, these phase change optical disks, equivalent to a DVD-Video in recording capacity, are available for use as video recording optical disks that will replace VTRs.

However, it has been pointed out that the recording by the phase-change recording method, if repeated several thousands to scores of thousands times, would degrade the reproduced signal and prevent information from being reproduced correctly (see JP-A-10-49872 disclosed on Feb. 20, 1998). The phase change recording method melts the recording film during information recording. This means that the viscosity of the melted area of the recording film decreases and that the recording film flows in some direction. This also changes the thickness in some areas in the recording film. The central level of the reproduced signal and the amplitude depend largely on the thickness of the recording film. As a result, a degradation that depends upon the thickness of the recording film occurs in the reproduced signal, causing jitters.

To solve this problem, two information recording methods have been devised (Both are described in JP-A-10-49872 described above).

One method is to shift the information recording start position by about eight bytes randomly each time information is recorded in each sector. This method shifts each two consecutive melting parts by at least eight bytes even if the same pattern information is recorded and therefore minimizes the amount of recording film flow described above. The other method is to reverse the polarity of recorded information each time information is recorded in each sector. The optical disk system described above employs the mark edge recording method. This mark edge recording method records marks (parts melted by a high-power pulse train), each having its own length, and spaces (parts created by directing a relatively low-power energy to mark-recorded parts to change them to crystallized parts) and associates the edge positions (both ends) of each mark with information. Unless the relative positions of the edges change, this method retains information even if marks and spaces are reversed. Therefore, even if the polarity is changed alternately, no problem is generated. The method repeats the cycle in which melted parts are crystallized the next time information is recorded, thus minimizing the deterioration in the reproduced signal caused by the recording film flow.

The two methods described above, which are very excellent technologies, are employed as the standard of the 2.6 GB DVD-RAM and the 4.7 GB DVD-RAM.

SUMMARY OF THE INVENTION

The prior art methods described above are very excellent. As a matter of fact, recording the same pattern of information on a 2.6 GB DVD-RAM in the method described above, if repeated about 100,000 times, gives the practically usable reproduced-signal quality. However, recording the same pattern of information on a 4.7 GB DVD-RAM in the method described above, if repeated several thousand times, results in 15% or higher jitters in the reproduced signal, possibly giving practical inconvenience. The investigation made by the inventor and the colleagues reveals at least two causes for this problem. One cause is that the amplitude of the signal reproduced from the shortest mark on the 4.7 GB DVD-RAM is 10 dB or lower than that of the 2.6 GB DVD-RAM. This is because the shortest mark of the 2.6 GB DVD-RAM is about 0.6 microns and the shortest mark of the 4.7 GB DVD-RAM is about 0.42 microns, about ⅔times shorter than that of the 2.6 GB DVD-RAM. As a result, when the thickness of the recording film changes as described above, the central amplitude level of the reproduced signal and the variation in the amplitude largely exceed the allowable range on a relative basis.

Another cause is that, even if one of the above two methods is used, one sector may include a part which is thicker or thinner than the allowable range. A careful study indicates that the flow direction of the recording film depends on the length of a recorded mark. That is, in part A, which is a part of the mark strings of a recording pattern (mark-space arrangement in one sector) in a sector, where there are many 3T marks, the recording film flows in the beginning-to-end direction of the sector. On the other hand, in part B where there are many 4T–14T marks, the recording film flows in the end-to-beginning direction in contract to the part where there are many 3T marks. As a result, depending upon the positional relation between part A and part B, the thickness of the recording film exceeds the allowable range (becomes thick or thin) in the boundary between part A and part B.

Therefore, it is a first object of the present invention to provide an information recording method and an information recording apparatus, as well as an information recording medium, that do not generate an area where the thickness of the recording film exceeds the allowable range and that minimizes the change in the central amplitude level of the reproduced signal and in the amplitude of the reproduced signal even if information is re-written more than tens of thousands times.

In addition, even if the above problem is solved, the thickness of the recording film may exceed the allowable range in the beginning and end of a sector and that part of the sector may largely degrade the reproduced signal. This condition occurs when the recording film flow may be suppressed partially but not in the whole sector. That is, when there is an average recording film flow in the whole sector (the amount of beginning-to-end direction flow of a sector does not match that of the opposite direction flow), the thickness of the recording film exceeds the allowable range in a part near the beginning or the end of the sector.

Therefore, it is a second object of the present invention to provide an information recording method and an information recording apparatus, as well as an information recording medium, that do not generate, in the beginning or end area of a sector, an area where the thickness of the recording film exceeds the allowable range and that minimize the change in the central amplitude level of the reproduced signal and in the amplitude of the reproduced signal even if information is re-written more than tens of thousands times.

(1) According to one aspect of the present invention, there is provided a method for recording information for use with an information recording medium on which a relatively-moving energy beam strikes to melt a recording film and to record marks corresponding to information, the method comprising a first step for recording a mark string of at least one dummy pattern in a predetermined position before a second step for recording a mark string of a recording pattern corresponding to original information in the predetermined position.

This method records a mark string of a dummy pattern different from that of an original pattern in the first step even when a mark string of the same original pattern must be recorded repeatedly in a predetermined position. This reduces the possibility that an area where the thickness of the recording film is changed is generated. However, even when information is recorded in the method described above, a reproduced signal degradation may occur in the beginning and end of a sector. In that case, the following information recording method should be used.

(2) According to another aspect of the present invention, there is provided the method for recording information described in (1) wherein the melting causes the recording film to flow in a relative moving direction of the information recording medium and the energy beam or in an opposite direction and the flow direction is changed in response to the mark string of an original pattern corresponding to the original information and/or the mark string of the dummy pattern and wherein, in the first step, the mark string of the dummy pattern whose average recording film flow direction is different from that of the original pattern recorded in the second step is recorded at least before the second step.

This method prevents an average recording film flow in the whole sector, minimizing the amount of degradation of the reproduced signal in the beginning and end of a sector. For example, when the recording of an original pattern causes the recording film to flow from the end to the beginning of the sector in the second step, the mark string of a dummy pattern causing the recording film to flow from the beginning to the end should be recorded in the first step. In addition, recording a mark string of two dummy patterns, as described below, allows the recording film flow direction to be controlled more precisely.

(3) According to another aspect of the present invention, there is provided the method for recording information described in (1) wherein the melting causes the recording film to flow in a relative moving direction of the information recording medium and the energy beam or in an opposite direction and the flow direction is changed in response to the mark string of the dummy pattern and wherein, in the first step, the mark strings of at least two dummy patterns are recorded at least before the second step, at least two dummy patterns having different average recording film flow directions.

When doing mark edge recording, a mark string of recording patterns corresponding to information including marks with different lengths is recorded. The inventor and the colleagues have revealed that, in such a case, the recording film flow direction depends on the mark length and that the recording film flows from the beginning to the end of the sector or from the end to the beginning of the sector depending upon the mark length. In addition, they have revealed that average recording film flow direction depends on the existence probability of marks of various lengths. Furthermore, they have revealed that the recording film flow direction may be controlled more efficiently in the first step by separately recording a dummy pattern including marks causing the recording film to flow from the beginning to the end of the sector and a dummy pattern including marks causing the recording film to flow from the end to the beginning of the sector. That is, the following information recording method is excellent.

(4) According to another aspect of the present invention, there is provided the method for recording information described in (3) wherein, in the second step, the information is recorded on the information recording medium as a plurality of marks each with its own length and a plurality of spaces (areas between two marks) each with its own length, the melting causes the recording film to flow in the relative moving direction of the information recording medium and the energy beam or in the opposite direction, and the flow direction is changed in response to the mark length and wherein, in the first step, the mark strings of at least two dummy patterns are recorded, each of the mark strings including a first mark group causing the recording film to flow in the relative moving direction and a second mark group causing the recording film to flow in an direction opposite to the relative moving direction.

It is desired that the mark string of a dummy pattern be recorded three or four times immediately before the mark string of an original pattern is recorded. However, if the time required for the first step exceeds the allowable range, the mark string of a dummy pattern may be recorded once or twice immediately before the mark string of an original pattern is recorded. In this case, because the dummy patterns are limited to one or two types, they may be randomly or sequentially selected from several types of dummy patterns and recorded.

(5) According to another aspect of the present invention, there is provided the method for recording information described in (1) wherein there are plurality of mark strings of dummy patterns and, from the mark strings of the plurality of dummy patterns, the mark strings of dummy patterns are selected randomly or sequentially for recording in the first step.

In the case of 4.7 GB DVD-RAM, for example, there is an area, such as the defect management area, where the original pattern is likely to be the same in most cases. Therefore, it is more efficient to use the method described above only when information is recorded in such an area.

(6) According to another aspect of the present invention, there is provided the method for recording information described in (1) wherein the predetermined position is a non-user data area such as a defect management area and a user data management area.

The first mark group and the second mark group may depend on the structure of the information recording medium or on the modulated waveform (recorded waveform) of the energy beam intensity for recording marks. In such a case, dummy pattern information and/or recording waveforms suited for the information recording medium should be recorded on the information recording medium as described below.

(7) According to another aspect of the present invention, there is provided the recording information medium for use in the method described in (1), wherein the medium has an area where information on the dummy pattern is recorded.

To implement the method for recording information described in (1), an apparatus for recording information described below is suitable.

(8) According to another aspect of the present invention, there is provided an apparatus for recording information for implementing the method for recording information described in (1), comprising an energy beam generator; an information recording medium moving unit which relatively moves the information recording medium and the energy beam; and a dummy pattern generator which generates the dummy patterns for use in the first step.

(9) According to another aspect of the present invention, there is provided the apparatus for recording information described in (8), further comprising a dummy pattern selector which randomly or sequentially selects the dummy patterns generated by the dummy pattern generator.

(10) According to another aspect of the present invention, there is provided the apparatus for recording information described in (8), further comprising a dummy pattern reproducer which reproduces dummy pattern information recorded on the information recording medium; and a dummy pattern transmitter which transmits the dummy pattern information to the dummy pattern generator.

DESCRIPTION OF THE EMBODIMENTS

The present invention will be described in detail using an embodiment. A method according to the present invention uses a one-beam overwrite mode in which information is written by one beam while erasing already-written information.

First, an optical disk (4.7 GB DVD-RAM) used in this embodiment will be described. The 4.7 GB DVD-RAM uses a phase change recording film on which a laser beam is stricken to heat the recording film to a temperature above the melting point to record a mark thereon.

The disk has a 35-zone user data area extending in the radius direction. The management areas such as Defect Management Area (DMA) are located in the inner and outer sides of the user data area. In the innermost side is located the pre-pit control data area which contains information such as disk linear velocity speed information, recording waveform information, and manufacture's information. Each zone and the management area are each divided into 25 to 59 sectors by the pre-pit PID (Physical Identification Data).

Figure 1:
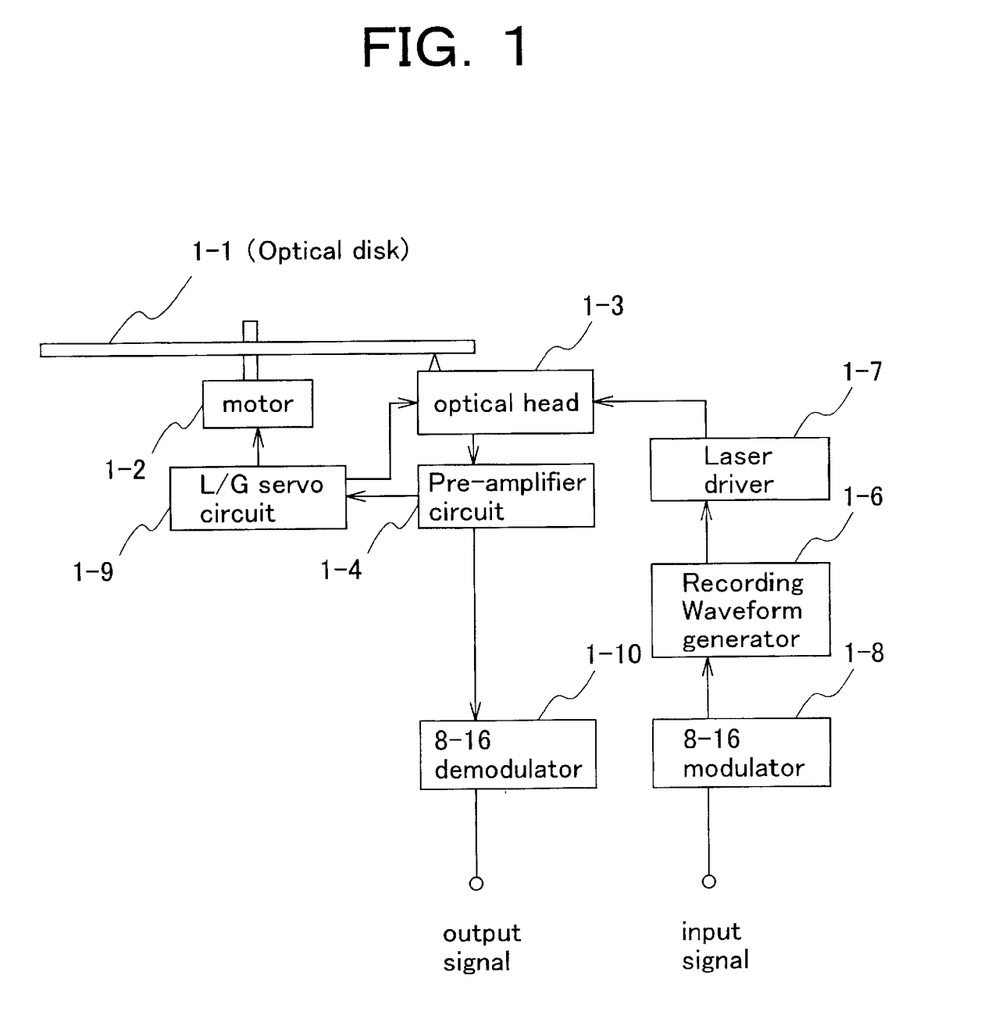
FIG. 1 is a block diagram showing the overview of an information recording apparatus used in an embodiment of the present invention.

Information was recorded on, and reproduced from, this optical disk with an information recording/reproducing apparatus shown in FIG. 1. The operation of the information recording/reproducing apparatus will be described below. The motor used to record or reproduce information uses the ZCLV (Zone Constant Linear Velocity) method which changes the number of disk rotations for each zone to or from which information is recorded or reproduced. The disk linear velocity is about 8.2 m/s.

Information sent from external to the recording apparatus is sent to an 8-16 modulator 1-8, eight bits at a time. When recording information on an optical disk 1-1, a modulation method by which eight bits of information is converted to 16 bits, that is, an 8-16 modulation method, is used. This modulation method records information, 3T to 14T in mark length, on the medium, each piece of information corresponding to eight bits. The 8-16 modulator 1-8 shown in the figure performs this modulation. The symbol T indicates the clock period at information recording time. In this case, T is 17.1 ns.

The digital signal, 3T to 14T in mark length and converted by the 8-16 modulator 1-8, is transferred to a recording waveform generator 1-6. With the high-power pulse width of about T/2, this circuit generates multi-pulse recording waveforms so that a low-power level laser beam with the width of about T/2 is produced while a high-power level laser beam is produced and so that an intermediate-power level laser beam is produced while a sequence of high-power level pulses described above are generated. At this time, the high-power level of 10.0 mW is used to form a recording mark, and the intermediate power level of 4.0 mW to erase a recording mark. In addition, within the recording waveform generator 1-6, the 3T–14T signals are associated alternately with 0s and 1s on a time-series basis. When the value is 0, the intermediate-power level laser power beam strikes the disk; when the value is 1, a laser beam to create a sequence of high-power pulse trains including high-power level pulses strikes the disk. In this case, a part on the optical disk 1 where the intermediate-power level energy beam is stricken is crystallized (space). On the other hand, a part where an energy beam to create a sequence of high-power pulse trains including high-power level pulses is stricken is turned into a non-crystalline area (mark). In addition, to form a sequence of high-power pulse trains including high-power level pulses for creating a mark, the recording waveform generator 1-6 includes a multi-pulse waveform table. This table corresponds to the method (adaptive recording waveform control) in which the width of the first pulse and the width of the last pulse are changed according to the length of spaces before and after the mark. With the use of this table, the circuit generates multi-pulse recording waveforms that minimize the effect of thermal interference generated between marks.

The recording waveform, which is generated by the recording wave generating circuit 1-6, is transferred to a laser driver 1-7. Based on the recording waveform, the laser driver 1-7 causes a semiconductor laser within an optical head 1-3 to emit a laser beam.

The optical head 1-3 installed on this recording apparatus uses a semiconductor laser with the optical wavelength of 655 nm as the information recording energy beam. The optical head uses an NA0.6 lens to focus the laser beam onto the recording layer of the optical disk 1-1, directs the laser energy beam corresponding to the recording waveform described above, and melts the recording film to record information.

The recording apparatus uses a method (so-called landgroove recording method) in which information is recorded both in a groove and on a land (an area between grooves). The recording apparatus has an L/G servo circuit 1-9 to allow tracking to be selected for a land and a groove. The optical head 1-3 is used also to reproduce recorded information. That is, the optical head directs an energy beam to a recorded mark to detect a light reflected from a mark area and a light reflected from a non-mark area to obtain the reproduced signal. The amplitude of the reproduced signal is amplified by a pre-amplifier circuit 1-4 and then transferred to an 8-16 demodulator 1-10. The 8-16 demodulator 1-10 converts information from each 16 bits to 8-bit information. The above operation reproduces a recorded mark.

When information is recorded on an optical disk 1-1 under the condition described above, the length of the shortest mark, 3T, is about 0.42 μm and the length of the longest mark, 14T, is about 1.96 μm.

Figure 2:
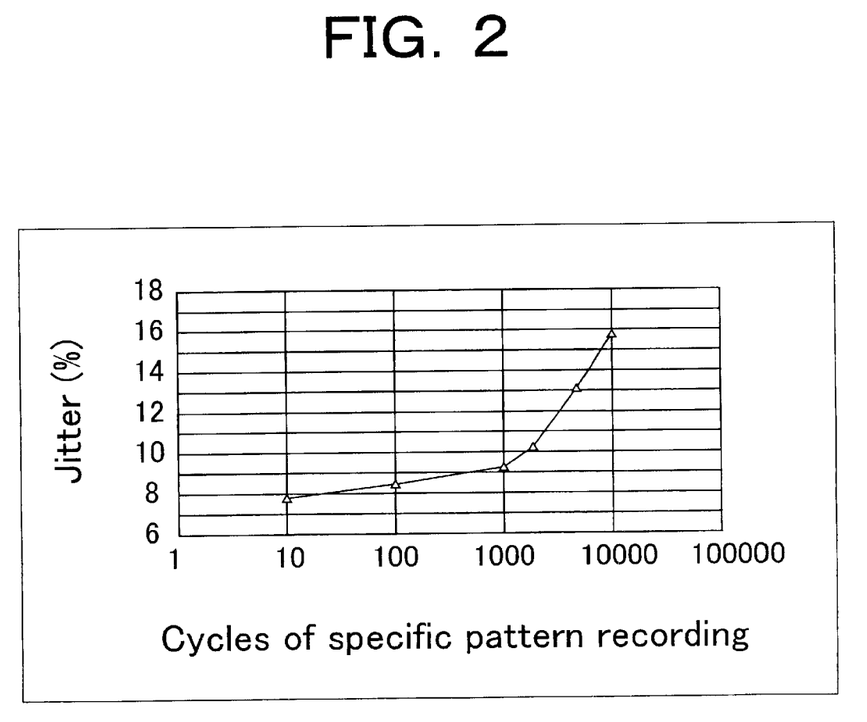
FIG. 2 is a diagram showing the relation between reproduced signal jitters and the cycles of specific pattern recording is recorded when information is recorded in the conventional method.

Using the apparatus described above, user information forming a mark array of the same pattern was recorded many times on a 4.7 GB DVD-RAM to check how the number of jitters of the reproduced signal depends on the number of recordings. FIG. 2 shows the result. The result indicates that the jitter percentage is 9% or lower while the number of recordings is 10 or lower. However, when the number of recordings exceeds 1000, the reproduced signal jitter percentage begins to increase sharply. When the number of recordings exceeds about 3000, the percentage exceeds the allowable level of 12%.

Figure 3:
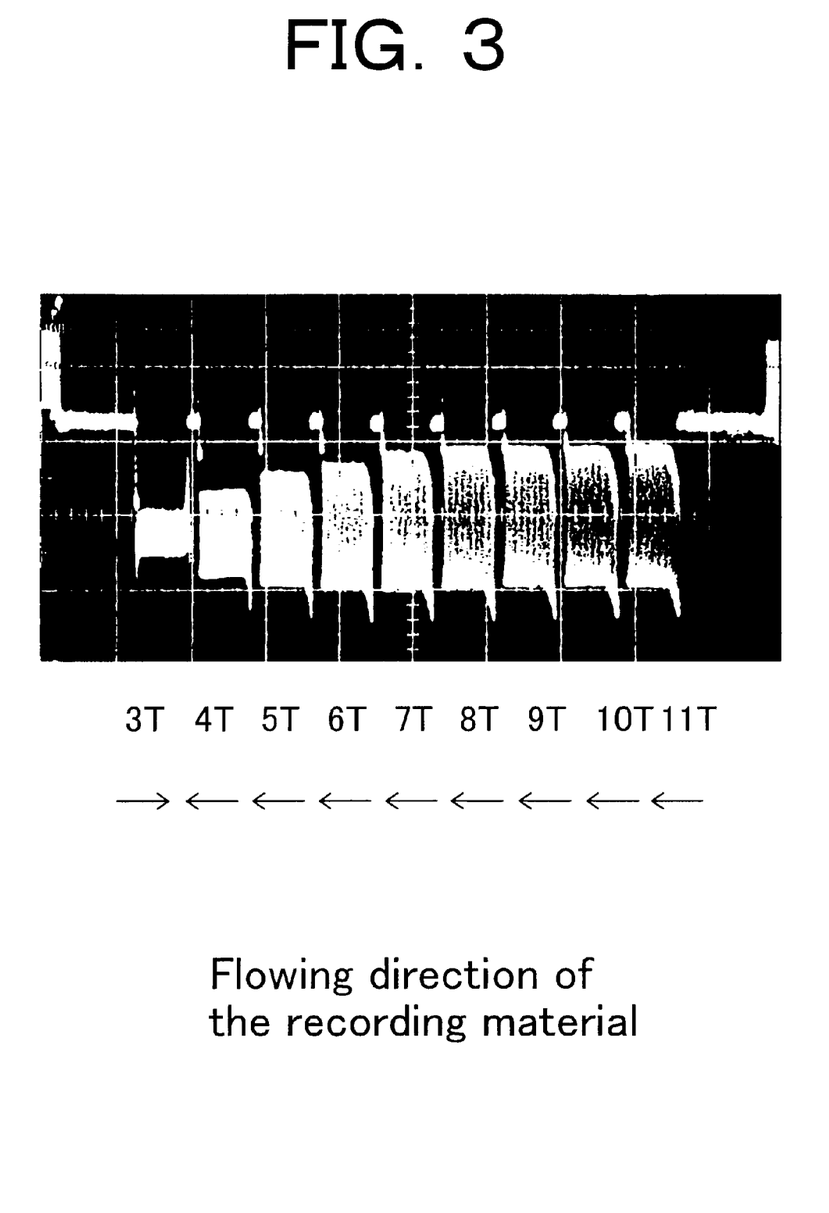
FIG. 3 is a diagram showing how a recording film flow depends on mark lengths.

To investigate the cause of the increase in the number of jitters, each of the 3T to 11T mark repetitive patterns was recorded in one sector. After 20,000 times of recording, the degradation of the reproduced signals was measured (FIG. 3). As shown in the figure, an area where the reproduced signal is largely degraded is found in the beginning and the end of the repetitive pattern recording area of each mark. For example, for the 3T mark repetitive pattern, the reflectance (signal level) of the beginning of the recording area is decreased and the reflectance of the end is increased. In contrast to the 3T mark pattern, the reflectance of the beginning of the 4T to 11T mark repetitive patterns is increased and the reflectance of the end is decreased. This symptom indicates that the recording film is melted as the marks are recorded and that the recording film flows. This results in the beginning of some areas becoming thick, and the end of some other areas becoming thin. A high reflectance indicates a thick recording film, while a low reflectance indicates a thin recording film. The figure also indicates that the 3T mark repetitive pattern and the 4T or larger repetitive mark pattern differ in the direction of recording film flow. For the 3T mark, the reflectance is increased (the recording film becomes thick) in the end of the recording area. This means that, when the 3T mark is recorded many times, the recording film flows in the direction from beginning to end. This also means that, when the 4T or larger marks are recorded, the recording film flows in the direction opposite to that of the 3T mark, that is, from end to beginning.

Figure 4A:
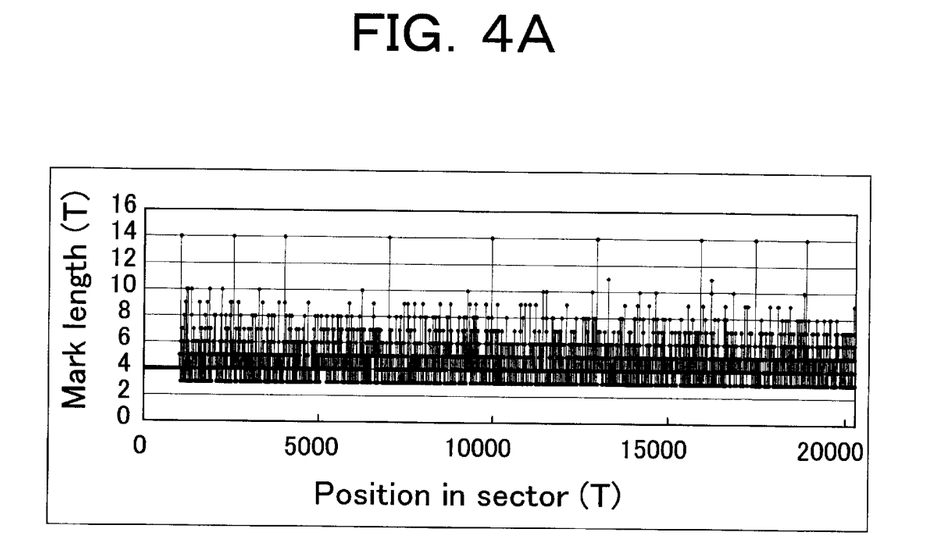
FIGS. 4A and 4B are diagrams showing the distribution of the lengths of marks in a sector.
Figure 4B:
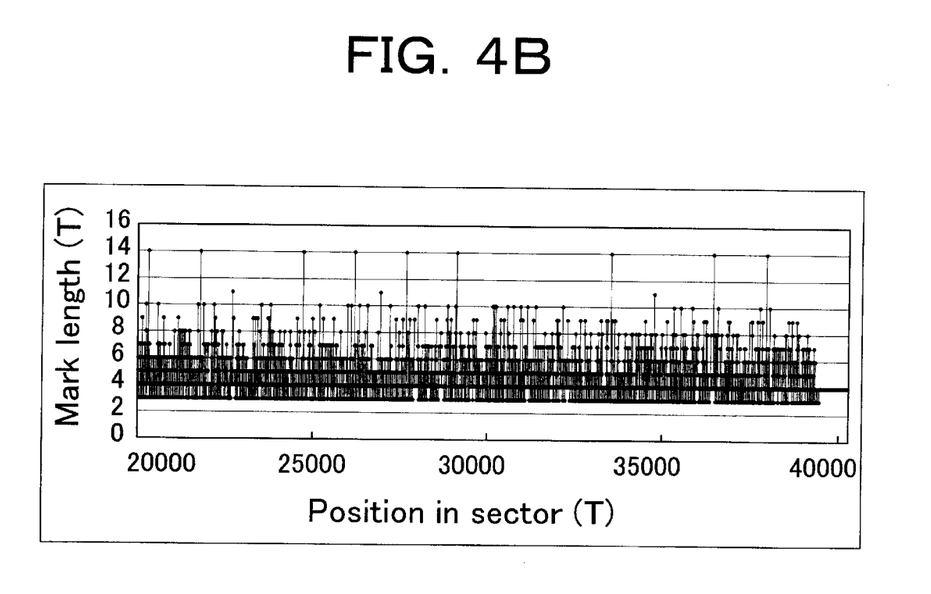

FIGS. 4A and 4B show an example of the relation between the positions in a sector, where random pattern signals modulated by the 8-16 modulator are recorded, and the lengths of marks included in the sector. As shown in the figure, the existence probability of 3T patterns is apparently low around positions-in-sector 5000T, 27000T, 28000T, and 31000T but is apparently high around positions-in-sector 3000T and 39000T. In such a case, the recording film flow near the beginning and the end of those areas makes the recording film thickness larger or smaller than the allowable range, generating jitters which largely degrade the reproduced signal.

Conventionally, when the same pattern is recorded repeatedly in a sector, the thickness of the recording film sometimes exceeds the allowable range in a particular position in the sector. This problem has not yet been solved completely and, therefore, the number of recordings is significantly limited. In particular, an area for managing the user data areas, such as the Defect Management Area (DMA), requires high reliability, because the area includes data on the destroyed areas and, at the same time, the area is a special area that is limited in size as compared with other data areas. On the other hand, almost the same disk management information is recorded at each recording time, and the same-pattern information is recorded in the Defect Management Area very frequently. Therefore, the problem described above is serious. Although the DVD/RAM standard defines that the mark and the space be reversed randomly during the recording of the same digital pattern, this standard does not give a sufficient number of repetitive recordings.

To solve the above problem, the inventor and the colleagues have invented a method for recording dummy data before recording original information. This recording of dummy data returns the recording film of an area, whose thickness has been changed by a recording film flow, to a correct state. That is, before recording original information of a specific pattern including the same sequence of 0s and 1s, the method records a pattern (dummy pattern) different from the specific pattern, once for at least several times, to distribute the above-described change in the recording film thickness (The dummy pattern is not a sequence including only digital signal 0s). Or, this method records a dummy pattern each time before recording original information to give a better result. In addition, the inventor and the colleagues have invented a dummy pattern best for the dummy. The inventors and colleagues also have invented a method for solving the degradation in the beginning and the end of the reproduced signal that depends on the existence probability of the marks within one sector and that are generated by the recording film flow within the whole sector.

Figure 5:
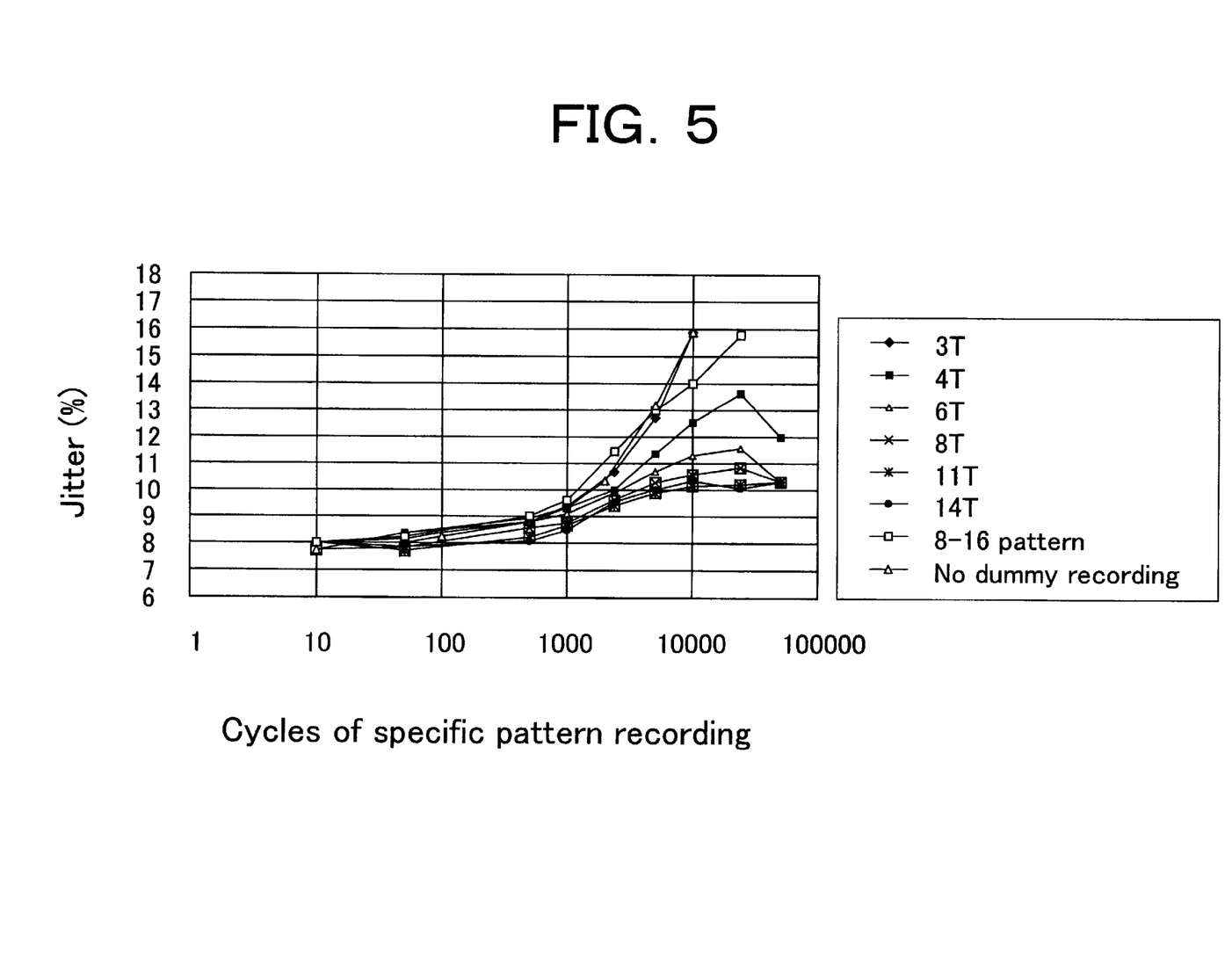
FIG. 5 is a diagram showing how jitters are reduced by a dummy recording method in the embodiment of the present invention.

FIG. 5 shows how jitters in the reproduced signals depend on the number of recordings when each of the 3T, 4T, 6T, 8T, 11T, and 14T mark repetitive patterns and a dummy pattern, different from the original specific pattern and produced by the 8-16 modulator, are recorded as the dummy pattern once before the original particular pattern is recorded. The number of recordings described above refers to the number of times the above specific pattern is recorded. In the conventional method in which only the original specific pattern is recorded, the percentage of jitters exceeds the allowable range of 12% when the number of recordings reaches about 3000. On the other hand, when the 4T mark repetitive pattern is used as the dummy pattern, the percentage of jitters exceeds the allowable range of 12% when the number of recordings reaches 7000. When the dummy pattern is a 6T or larger pattern, the percentage of jitters is as low as about 10.5% even when the number of recording is 50000. This means a significant increase in the number of recordings.

Figure 6:
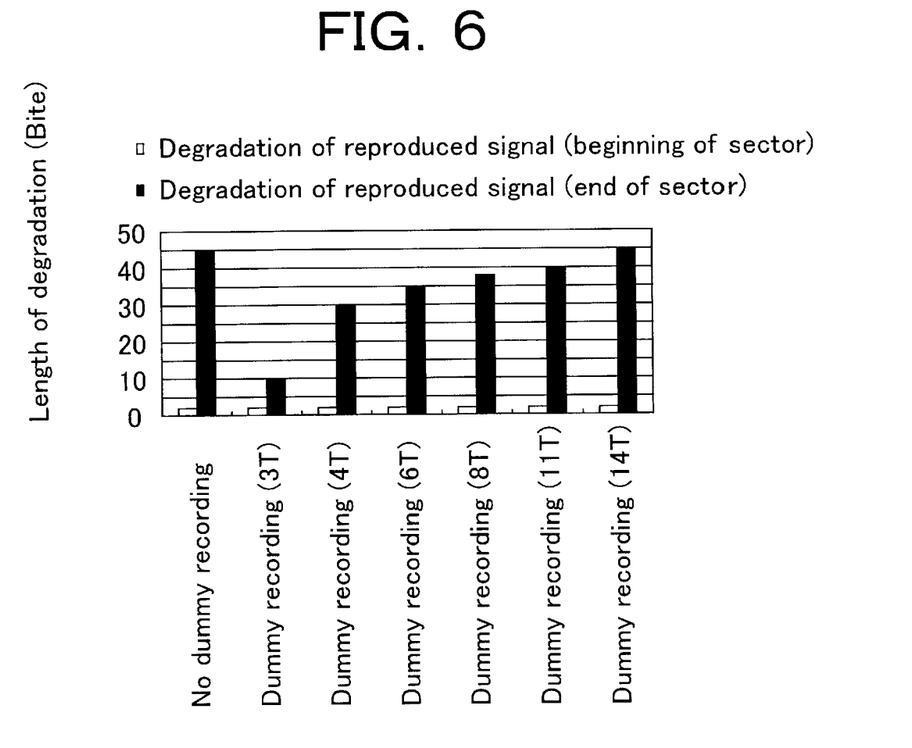
FIG. 6 is a diagram showing how the degradation of reproduced signals in the beginning and end of a sector is reduced by the dummy recording method used in the embodiment of the present invention.
Figure 7:
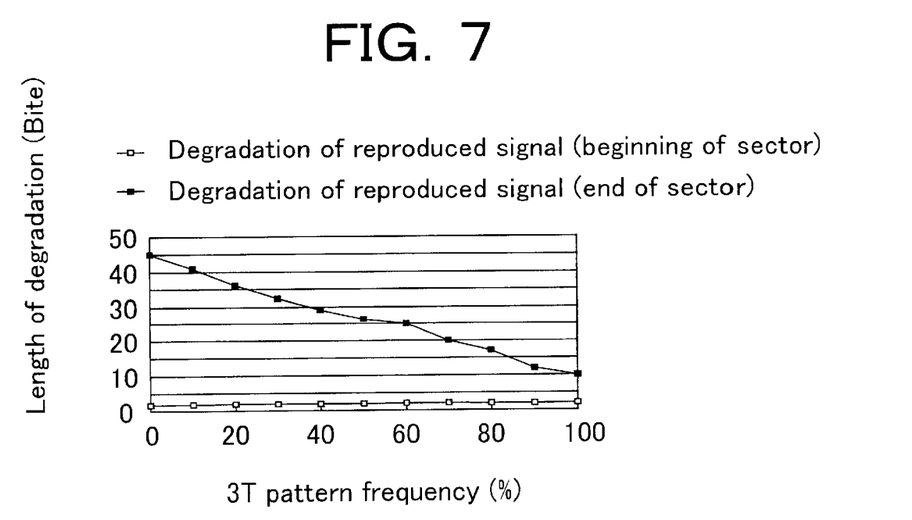
FIG. 7 is a diagram showing how the degradation of reproduced signals in the beginning and end of a sector is reduced by the dummy recording method used in the embodiment of the present invention.

FIG. 6 shows the sizes of areas in the beginning and the end of a sector where a reproduced-signal degradation is generated after 50000 times of recordings with or without dummy recording using the dummy patterns described above. When no dummy recording is done, the area is 45 bytes which are larger than the target size of 40 bytes. On the other hand, when dummy recording is done with the use of the 3T to 11T dummy patterns, the size of an area where a reproduced-signal degradation occurred may be reduced to a size smaller than the target. FIG. 7 shows the amount of reproduced-signal degradation that occurred in the beginning and end of a sector when the frequency at which the dummy patterns, 11T and 3T, were recorded as the dummy pattern was changed. When the frequency at which the 3T pattern is used for dummy recording is 12% or higher, the degradation in the beginning and end may be reduced to a value lower than the target. In particular, when the frequency at which the 3T pattern is recorded is 20%, the jitters after 50,000 times of recordings is 11% which is lower than the target value of 12%.

The optimum frequency of the 3T mark described above depends on the optical disk on which to write information. The optimum 3T pattern frequencies are shown below when the above test was made on optical disk of various structures.

Disk A: 20% (reproduced-signal degradation amount in trailing edge of sector: 36 bytes, jitter: 11%);

Disk B: 0% (reproduced-signal degradation amount in end of sector: 40 bytes, jitter: 10%);

Disk C: 10% (reproduced-signal degradation amount in end of sector: 40 bytes, jitter: 11.5%);

Disk D: 35% (reproduced-signal degradation amount in end of sector: 40 bytes, jitter: 11.5%).

The recording film flow differs according to the optical disk because the layer structure and the recording film composition differ according to the optical disk.

In such a case, information such as the dummy pattern type, dummy pattern combination, and pattern frequency should be recorded in the areas, such as the control data area, which are allocated on the inner circumference of the optical disk.

In addition to the method in which the recording frequencies of the 3T pattern and the 11T pattern are changed, the use of a dummy pattern in which the 3T pattern and the 11T pattern appear alternately, for example, every four bytes, gives the same result.

In such a case, the dummy pattern information should be recorded in advance in areas, such as the control data area of the optical disk, as described above. Then, the optical disk apparatus is able to reproduce the dummy pattern information from the optical disk and, based on the reproduced dummy pattern information, to generate a dummy pattern to do dummy recording detailed above.

Figure 8:
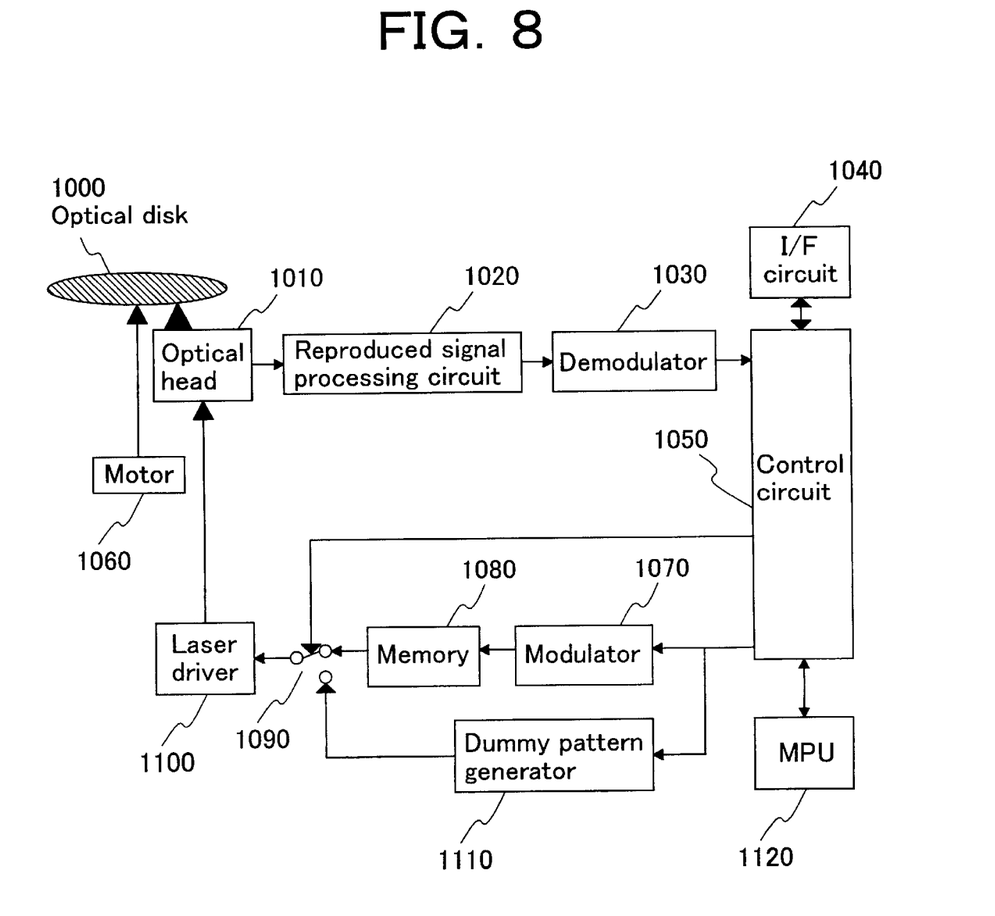
FIG. 8 is a diagram showing the information recording apparatus used in the embodiment of the present invention.

FIG. 8 shows an embodiment of an optical disk apparatus for implementing the present invention.

Referring to the figure, a motor 1060 turns an optical disk medium 1000 to which an optical beam is directed by an optical head 1010. To reproduce a signal, a reproduced signal processing circuit 1020 amplifies and waveform-equalizes the signal received from the optical head 1010, and converts the signal to binary. Then, a demodulator 1030 demodulates the signal to code information. The obtained code information is sent to a host computer or some other unit, not shown in the figure, via an interface circuit 1040. To record a signal, a modulator 1070 modulates code information, transferred via the interface circuit 1040, to 8-16 code and so on and stores the modulated code in a memory 1080. According to the stored code, a laser driver 1100 intensity-modulates a laser beam and forms a mark in a specified position on the optical disk medium via the optical head 1010.

In the case of a phase change optical disk, the quality of a mark formed on the optical disk medium is deteriorated by rewriting the mark as described above. Frequently-rewritten areas on an optical disk are management information areas including the alternate information management area and the directory information area. The alternate information management area is allocated in the predetermined physical addresses on the optical disk. The location of the directory information, though dependent on the logical format, is usually begins at logical address O. Therefore, at a recording time, an MPU 1120 checks if there is a probability that a specified logical address indicates an address where directory information is stored or if the alternate information management area must be rewritten to reflect a defect. Upon detecting such a condition, the MPU 1120 records a dummy signal before recording the specified information and then rewrites it.

Dummy information is recorded according to one of two procedures described below. The first procedure is as follows. The signal to be intensity-modulated by the laser driver 1100 is stored in the memory 1080. Therefore, to record a desired signal on the optical disk medium, the MPU 1120 directly rewrites the contents of the memory via a control circuit 1050.

The first procedure always involves an overhead for transferring the signal to the memory. To speed up the processing, the second procedure is used. A dummy pattern generator 1110 generates predetermined signals, such as 3T or 11T repetitive signal patterns, on a hardware basis. A switch 1090 is provided to select one of the signals with which to drive the laser driver 1100: the contents generated by the modulator 1070 or the signal generated by the dummy pattern generator 1110. In the second procedure, the switch 1090 selects the dummy pattern generator 1110 and drives the laser driver 1100 to record the dummy signal. Then, the switch 1090 selects the memory contents generated by the modulator to overwrite the specified data. In case the dummy pattern generator 1110 generates a plurality of patterns, special patterns to be used may be selected according to the frequency as instructed by the MPU 1120.

The recording processing in this embodiment always requires an additional time for recording dummy pattern signals. However, dummy pattern signals need not always be recorded in both the alternate information management area and the directory information area. They may be recorded only in one of the areas. In addition, even when information must be written at an address where dummy recording is required, whether to do dummy recording may be decided according to the frequency established by random numbers and so on. For example, dummy recording may be done for the alternate information management area at the frequency of 30%.

In the embodiment of the present invention, even when a mark string of the same original pattern must be written repeatedly in a predetermined position, dummy recording is done in that position in advance to record a mark string of a dummy pattern different from the original pattern. This minimizes an area where the recording film thickness is changed.

In addition, the method according to the present invention prevents the recording film flow in the whole sector, minimizing the amount of degradation of the reproduced signal in the beginning and end of the sector. For example, when the recording of an original pattern causes the recording film to flow from the end to the beginning of the sector in the second step, a mark string of a dummy pattern causing the recording film to flow from the beginning to the end should be recorded in the first step. In addition, recording the mark strings of two dummy patterns allows the recording film flow direction to be controlled more precisely.

Furthermore, the present invention significantly increases the reliability of the system including the apparatus and the medium for multiple-time recording.

What is claimed is:

1. A method of recording information for use with an information recording medium on which a relatively-moving energy beam strikes to melt a recording film and to record a mark corresponding to information, the method comprising:

a first step of recording a mark string of at least one dummy pattern in a predetermined position; and a second step for recording a mark string of a recording pattern corresponding to original information in the predetermined position after the first step.

2. A method of recording information according to claim 1, wherein the melting causes the recording film to flow in a relative moving direction of the information recording medium and the energy beam or in an opposite direction and the flow direction is changed in response to the mark string of the recording pattern corresponding to the original information and/or the mark string of the dummy pattern and wherein, in the first step, the mark string of the dummy pattern whose average recording film flow direction is different from that of the original pattern recorded in the second step is recorded at least before said second step.

3. A method of recording information according to claim 1, wherein the melting causes the recording film to flow in a relative moving direction of the information recording medium and the energy beam or in an opposite direction and the flow direction is changed in response to the mark string of the dummy pattern and wherein, in the first step, the mark strings of at least two dummy patterns are recorded at least before said second step, said at least two dummy patterns having different average recording film flow directions.

4. A method of recording information according to claim 3, wherein, in said second step, the information is recorded on the information recording medium as a plurality of marks each with its own length and a plurality of spaces (areas between two marks) each with its own length and the melting causes the recording film to flow in the relative moving direction of the information recording medium and the energy beam or in the opposite direction with the flow direction being changed in response to the mark length and wherein, in the first step, the mark strings of at least two dummy patterns are recorded, each of said mark strings including a first mark group causing the recording film to flow in the relative moving direction and a second mark group causing the recording film to flow in an direction opposite to the relative moving direction.

5. A method of recording information according to claim 1, wherein there are plurality of dummy pattern information types and, from the mark strings of said plurality of dummy patterns, the mark strings of the dummy patterns are selected randomly or sequentially for recording in said first step.

6. A method of recording information according to claim 1, wherein the predetermined position is a non-user data area such as a defect management area and a user data management area.

7. A recording information medium for use in the method according to claim 1, wherein said medium has an area where information on the dummy pattern is recorded.

8. A method for recording information for use with an information recording medium on which a relatively-moving energy beam generated by an energy beam generator strikes to melt a recording film and to record a mark corresponding to information, the method comprising:

relatively moving the information recording medium and the energy beam with an information recording medium moving unit; and a first step of recording a mark string of at least one dummy pattern generated by a dummy pattern generator in a predetermined position before a second step for recording a mark string of a recording pattern corresponding to original information in the predetermined position.

9. A method for recording information according to claim 8, further comprising:

randomly or sequentially selecting the dummy patterns generated by the dummy pattern generator.

10. A method for recording information according to claim 8, further comprising:

reproducing dummy pattern information recorded on the information recording medium by a dummy pattern reproducer; and transmitting the dummy pattern information to the dummy pattern generator with a dummy pattern transmitter.

11. A method for recording information comprising:

a step of recording a dummy pattern, once for a plurality of recordings, in an area where a same specific pattern is recorded repeatedly, said area being in an information recording medium.

12. A method for recording information comprising:

a step of recording dummy patterns alternatively in an area where a same specific pattern is recorded repeatedly, said area being in an information recording medium.

13. A method of recording information according to claim 11, wherein the area where the same specific pattern is recorded repeatedly is a management information area, an alternate information management area, or a directory information area.

14. A method of recording information according to claim 12, wherein the area where the same specific pattern is recorded repeatedly is a management information area, an alternate information management area, or a directory information area.

* * * * *